US006748422B2

(12) United States Patent
Morin et al.

(10) Patent No.: US 6,748,422 B2
(45) Date of Patent: Jun. 8, 2004

(54) SYSTEM AND METHOD TO CONTROL SENDING OF UNSOLICITED COMMUNICATIONS RELATING TO A PLURALITY OF LISTINGS IN A NETWORK-BASED COMMERCE FACILITY

(75) Inventors: Noel Morin, Boulder Creek, CA (US); Hilary Holmquest, Menlo Park, CA (US)

(73) Assignee: eBay Inc., San Jose, CA (US)

(*) Notice: Subject to any disclaimer, the term of this patent is extended or adjusted under 35 U.S.C. 154(b) by 326 days.

(21) Appl. No.: 09/982,415

(22) Filed: Oct. 17, 2001

(65) Prior Publication Data

US 2003/0074397 A1 Apr. 17, 2003

Related U.S. Application Data

(60) Provisional application No. 60/242,026, filed on Oct. 19, 2000.

(51) Int. Cl.$^7$ .............................................. G06F 13/00
(52) U.S. Cl. ....................................................... 709/206
(58) Field of Search ................................ 709/200, 206, 709/219, 313, 238, 225; 707/100; 705/1, 26

(56) References Cited

U.S. PATENT DOCUMENTS

| 3,573,747 A | 4/1971 | Adams et al. |
| 3,581,072 A | 5/1971 | Nymayer |
| 4,412,287 A | 10/1983 | Braddock, III |
| 4,674,044 A | 6/1987 | Kalmus et al. |
| 4,677,552 A | 6/1987 | Sibley, Jr. |
| 4,789,928 A | 12/1988 | Fujisaki |
| 4,799,156 A | 1/1989 | Shavit et al. |
| 4,823,265 A | 4/1989 | Nelson |

(List continued on next page.)

FOREIGN PATENT DOCUMENTS

| CA | 2253543 | 3/1997 |
| FR | 2658635 A1 | 2/1991 |
| NL | 9300266 | 2/1993 |
| WO | WO 92/15174 | 2/1992 |
| WO | WO95/17711 | 6/1995 |
| WO | WO 96/34356 | 4/1996 |
| WO | WO 97/37315 | 3/1997 |
| WO | WO99/63461 | 12/1999 |

OTHER PUBLICATIONS

Malone, T.W.; Yates, J; et al., "Electronic Markets and Electronic Hierarchies", *Communication—of the ACM*, Jun. 1987, pp. 484–497, vol. 30, No. 6.

Warbelow, A; Kokuryo, J, "Aucnet: TV Auction Network System". *Harvard Business School Case/Study*, Jul. 1989, pp. 1–15, HBVR# 9–190–001, USA.

"Personal Optimized Decision/Transaction Program", *IBM Technical Disclosure Bulletin*, Jan. 1995, pp. 83–84, vol. 38, No. 1.

(List continued on next page.)

*Primary Examiner*—Robert B Harrell
(74) *Attorney, Agent, or Firm*—Blakely, Sokoloff, Taylor & Zafman LLP

(57) ABSTRACT

A system and method to control sending of unsolicited communications over a network is provided. Typically, the network is the Internet and the system defines a SPAM prevention tool for users of an on-line service, such as an on-line bidding service. Users may contact an intended recipient with a contact form, which is forwarded to the recipient's e-mail address by an on-line service provider. A link accessible from a Web site allows recipients of unsolicited e-mail to complain to the on-line service provider. Sanctions are implemented against the sender of unsolicited e-mail based on the frequency of complaints. When the complaint level against a sender reaches a certain threshold, the sender is unable to use the contact form for a predetermined time period.

77 Claims, 12 Drawing Sheets

U.S. PATENT DOCUMENTS

| | | |
|---|---|---|
| 4,864,516 A | 9/1989 | Gathier et al. |
| 4,903,201 A | 2/1990 | Wagner |
| 5,063,507 A | 11/1991 | Lindsey et al. |
| 5,077,665 A | 12/1991 | Sliverman et al. |
| 5,101,353 A | 3/1992 | Lupien et al. |
| 5,136,501 A | 8/1992 | Silverman et al. |
| 5,168,446 A | 12/1992 | Wiseman |
| 5,205,200 A | 4/1993 | Wright |
| 5,243,515 A | 9/1993 | Lee |
| 5,258,908 A | 11/1993 | Hartheimer et al. |
| 5,280,422 A | 1/1994 | Moe et al. |
| 5,297,031 A | 3/1994 | Gutterman et al. |
| 5,297,032 A | 3/1994 | Trojan et al. |
| 5,305,200 A | 4/1994 | Hartheimer et al. |
| 5,325,297 A | 6/1994 | Bird et al. |
| 5,329,589 A | 7/1994 | Fraser et al. |
| 5,375,055 A | 12/1994 | Togher et al. |
| 5,394,324 A | 2/1995 | Clearwater |
| 5,426,281 A | 6/1995 | Abecassis |
| 5,485,510 A | 1/1996 | Colbert |
| 5,553,145 A | 9/1996 | Micali |
| 5,557,728 A | 9/1996 | Garrett et al. |
| 5,596,994 A | 1/1997 | Bro |
| 5,598,557 A | 1/1997 | Doner et al. |
| 5,640,569 A | 6/1997 | Miller et al. |
| 5,657,389 A | 8/1997 | Houvener |
| 5,664,115 A | 9/1997 | Fraser |
| 5,689,652 A | 11/1997 | Lupien et al. |
| 5,694,546 A | 12/1997 | Reisman |
| 5,706,457 A | 1/1998 | Dwyer et al. |
| 5,710,889 A | 1/1998 | Clark et al. |
| 5,715,314 A | 2/1998 | Payne et al. |
| 5,715,402 A | 2/1998 | Popolo |
| 5,717,989 A | 2/1998 | Tozzoli et al. |
| 5,722,418 A | 3/1998 | Bro |
| 5,727,165 A | 3/1998 | Ordish et al. |
| 5,771,291 A | 6/1998 | Newton et al. |
| 5,771,380 A | 6/1998 | Tanaka et al. |
| 5,794,219 A | 8/1998 | Brown |
| 5,799,285 A | 8/1998 | Klingman |
| 5,803,500 A | 9/1998 | Mossberg |
| 5,818,914 A | 10/1998 | Fujisaki |
| 5,826,244 A | 10/1998 | Huberman |
| 5,835,896 A | 11/1998 | Fisher et al. |
| 5,845,265 A | 12/1998 | Woolston |
| 5,845,266 A | 12/1998 | Lupien et al. |
| 5,850,442 A | 12/1998 | Muftic |
| 5,872,848 A | 2/1999 | Romney et al. |
| 5,873,069 A | 2/1999 | Reuhl et al. |
| 5,884,056 A | 3/1999 | Steele |
| 5,890,138 A | 3/1999 | Godin et al. |
| 5,905,974 A | 5/1999 | Fraser et al. |
| 5,905,975 A | 5/1999 | Aussubel |
| 5,922,074 A | 7/1999 | Richard et al. |
| 5,924,072 A | 7/1999 | Havens |
| 5,926,794 A | 7/1999 | Fethe |
| 5,974,412 A | 10/1999 | Hazlehurst et al. |
| 5,991,739 A | 11/1999 | Cupps et al. |
| 6,035,402 A | 3/2000 | Vaeth et al. |
| 6,044,363 A | 3/2000 | Mori et al. |
| 6,055,518 A | 4/2000 | Franklin et al. |
| 6,058,417 A | 5/2000 | Hess et al. |
| 6,073,117 A | 6/2000 | Oyanagi et al. |
| 6,085,176 A | 7/2000 | Woolston |
| 6,104,815 A | 8/2000 | Alcorn et al. |
| 6,202,051 B1 | 3/2001 | Woolston |
| 6,230,188 B1 * | 5/2001 | Marcus ............ 709/206 |

OTHER PUBLICATIONS

NEO, B.S, "The implementation of an electronic market for pig trading in Singapore", *Journal of Strategic Information Systems*, Dec. 1992, pp. 278–288, vol. 1.

Rockoff, T.E; Groves, M., "Design of an Internet–based system for remote Dutch auctions", *Internet Research—Electronic Networking Applications and Policy*, Jan. 1, 1995, vol. 5, No. 4, pp. 10–16.

Massimb, M.N; Phelps, B.D, "Electronic Trading, Market Structure and Liquidity", *Financial Analysts Journal*, Jan.–Feb. 1994, Vol 50, No. 1, pp. 39–50.

Post, D.L; Coppinger, S.S, et al., "Application of Auctions as a Pricing Mechanism for the Interchange of Electric Power", *IEEE Transactions on Power Systems*, Aug. 1995, p. 7, vol. 10, No. 3.

Hess, C.M; Kemerer, C.F., "Computerized Loan Organization System: An Industry Case Study of the Electronic Markets Hypothesis", *MIS Quarterly*, Sep. 1994, vol. 18, No. 3, pp. 251–274.

Reck, Martin, "Formally Specifying and Automated Trade Execution System", *Journal of Systems and Software*, 1993, pp. 245–252, vol. 21.

"Anonymous Delivery of Goods in Electronic Commerce", *IBM Technical Disclosure Bulletin*, Mar. 1996, pp. 363–366, vol. 39, No. 3.

Lee, Ho G., " Electronic Brokerage and Electronic Auction: The Impact of IT on Market Structures", *Proceedings of the 29th HICSS*, 1996, pp. 397–406, vol. IV.

Clemons, E; Weber, B., "Evaluating the Prospects for Alternative Electronic Securities Markets", *International Conference on Information Systems*, 1991, pp. 53–61, vol. 12.

Mardesich, J., "Onsale takes auction gavel electronic", *Computer Reseller News*, Jul. 8, 1996, p. 2 continued on p. 32.

"Onsale joins fray as online shopping picks up speed: Internet Booms", *Computer Reseller News*, Jun. 5, 1995, p. 73 (www.dialogweb.com).

Siegmann, Ken, "Nowhere to go but up", *PC Week*, Oct. 23, 1995, p. 1–3, vol. 12, No. 42 (www.dialogweb.com).

"Onsale: Onsale Brings Thrill of Auctions and Bargain Hunting Online; Unique Internet retail service debuts with week–long charity auction for the Computer Museum in Boston", May 24, 1995, (pp 3) Dialog Web. 0489267 BW0022.

Schmid, B.F., "The Development of Electronic Commerce", *Newsletter of the Competence Centre Electronic Markets*, Oct. 1993, No. 9/10.

Tjostheim, I; Eide, J., "A case study of an on–line auction for the World Wide Web", Norwegian Computing Center, No Date Given, www/nr.no/gem/elcom/publikasjoner/enter98e.html.

Graham, I., "The Emergence of Linked Fish Markets in Europe", *Focus Theme*, No Date Given.

Reck, Martin, "Traing–Process Characteristics of Electronic Auctions", *Focus Theme*, No Date Given.

Van Heck, E.; Ribbers, P.M., "Experiences with Electronic Auctions in the Dutch Flower Industry", *Focus Theme*, No Date Given.

Lee, H.G., "AUCNET: Electronic Intermediary for Used–car Transactions", *Focus Theme*, No Date Given.

Klein, S., "Introduction to Electronic Auctions", *Focus Theme*, No Date Given.

Turban, E., "Auctions and Bidding on the Internet an Assessment", *Focus Theme*, No Date Given.

Zwass, Vladimir, "Electronic Commerce: Structures and Issues", *International Journal of Electronic Commerce*, Fall 1996, pp. 3–23, Vol, 1, No. 1, pp 3–23 (www.cba.bgsu.edu).

Priest, Chris; van Tol, Maarten, "Adaptive agents in a persistent shout double auction", Proceedings of the First International Conference on Information and Computation Economies, Oct. 25–281, 1998, Charleston, US.

Resnick, Paul; Zeckhauser, Richard; Friedman, Eric; Kuwabara, Ko, "Reputation Systems", Association for Computing Machinery, *Communications of the ACM*, vol. 43, No. 12, pp 45–48 ((Dialog.

Meade, Jim, visual 360: a performance appraisal system that's "fun"., *HR Magazine*, Jul., 1999 (Dialog file).

* cited by examiner

Use this form to send an email to Itara:

| | |
|---|---|
| To: | Itara |
| From: | zredwoods |
| Bcc to myself: | zredwoods |
| | ☑ Uncheck if you do *not* want to send a copy of this email to yourself   105 |
| Subject: | _____ 110 |
| Message: | [text area] |
| | Enter up to 2000 characters max. HTML cannot be displayed. |
| | SEND   120 |

Email Address and User ID History for: bizoubizou

The email address for this member is: micoul@hotmail.com  ~136

| User ID History | Effective Date | End Date |
|---|---|---|
| bizoubizou | Friday, May 28, 1999 | Present |

\*\*\* - Parts of prior User IDs that are email addresses are concealed to protect member privacy

FIG. 4B

| A Complaint received against member (complaints 1-3) | Auto-send educational email to sender | Member will receive an email from eBay to remind them of the proper use of the feature and refer them to the FAQ page. |
|---|---|---|
| 4th complaint is received in the past 6 months | Auto-send a warning email to inform sender that they are at risk of losing the privilege to use the system. | Member will receive a warning of potential loss of email system use. |
| 5th complaint is received in the past 6 months | Prevent members from being able to access the email system for 30 days and auto-send a message notifying them of their "suspension". | Member will receive an error prompt when clicking on the USER ID of another member in a non-transactional situation. |

FIG. 6B

SYSTEM AND METHOD TO CONTROL SENDING OF UNSOLICITED COMMUNICATIONS RELATING TO A PLURALITY OF LISTINGS IN A NETWORK-BASED COMMERCE FACILITY

CROSS REFERENCE TO RELATED APPLICATION

This application claims the priority from U.S. Provisional Patent Application No. 60/242,026, entitled "SPAM PREVENTION TOOL", filed on Oct. 19, 2000.

FIELD OF THE INVENTION

The present invention relates generally to electronic mail and, more particularly, to a system and method to control sending of unsolicited electronic mail over a network.

BACKGROUND

There is no question that the explosive growth of the Internet in recent years has changed classic business and economic models. One area in which this change has been noteworthy is in the use of mass marketing by electronic mail ("e-mail"). This form of marketing has become an attractive advertising medium for businesses and other organizations because it allows them to reach large numbers of consumers at minimal cost.

Nevertheless, the use of e-mail in this manner is often problematic for the recipients of these messages. On the Internet, SPAM is the term used to describe useless or unsolicited e-mail messages. Typically, the SPAM is of narrow interest. The aspiration of the "spammer" is to make a profit, even if only a small number of recipients respond. The sending and receiving of SPAM is especially onerous for online service providers because it reduces user satisfaction in their services. SPAM also wastes network resources and people's time.

Various methods exist to filter or otherwise counter unsolicited e-mail messages. For example, filtering techniques exist to block e-mail messages received from addresses that are sources of unsolicited e-mail. One problem associated with filtering techniques, however, is that the source of the unsolicited e-mail can easily change their address to bypass the system. Another problem associated with filtering techniques is that they often filter legitimate bulk e-mail messages that could be of interest to the user. Moreover, filtering techniques are often ineffective against robotic delivery programs that send out thousands of junk e-mail messages and create nonexistent source addresses to prevent detection. The cost of monitoring robotic delivery programs is usually high.

Although functionality exists in the prior art to allow recipients to complain about unsolicited e-mail, the process can be burdensome and time-consuming for the user. In addition, to date there has been little functionality to monitor complaints against particular sources and to effectively curtail the sending of unsolicited e-mails from these sources based on this monitoring function.

SUMMARY OF THE INVENTION

According to one aspect of the present invention, there is provided a system and method to control sending of unsolicited communications over a network. The system may define a SPAM inhibiting tool for users engaged in transactions over a network such as the Internet. Users of an on-line service, for example an on-line commerce service, who are interested in a non-transactional communication (e.g., a communication wherein the sending user is not engaged in a bidding transaction with a recipient user) with another user are provided with a proprietary contact form that allows them to contact other users without the sender viewing the e-mail address of the would-be recipient. This form appears only in cases where a user is contacting another and where the intended recipient is not involved in an active transaction (e.g., already bid on an item listed by the intended recipient) or a closed-successful transaction with the sender. In cases where an active transaction is involved, a seller may view all bidder e-mail addresses and bidders may view the seller's e-mail address.

In another aspect of the present invention, a network link is provided that allows recipients of forwarded messages to tag an incident as SPAM and to provide senders with feedback. For instance, users who click on the link receive a confirmation prompt advising them of the SPAM policy, what reporting of the incident means to the recipient and the sender, and the ability to classify the reason for the complaint. In a further aspect of the present invention, the system monitors the number of SPAM complaints received by a user and triggers events (e.g., inability to use the on-line services, warning flags, suspension flags, etc.) based on thresholds and displays for a user complaint level.

BRIEF DESCRIPTION OF THE DRAWINGS

The present invention is illustrated by way of example, and not limitation, in the figures of the accompanying drawings in which like reference numerals refer to similar elements and which:

FIG. 4A shows a sample form that allows users of an on-line service to engage in non-transactional communications with each other using e-mail according to one embodiment of the present invention;

FIG. 4B shows a sample form that appears on a user's screen when a user is a party to a transaction with another user according to one embodiment of the present invention;

FIGS. 6A and 6B show a matrix of exemplary sanctions implemented against users who SPAM other users of an on-line service according to one embodiment of the present invention;

FIGS. 7B-1 and 7B-2 combined show a diagram of the user-to-user non-transactional communication flow of FIG. 7A including implementation of a SPAM prevention feature;

DETAILED DESCRIPTION

Described herein is a system and method to control sending of unsolicited communications over a network. The system and method may thus define a SPAM prevention tool. Although well-suited for use in on-line commerce services, the SPAM prevention tool described below may also be utilized for other types of applications, such as simple on-line transactions (e.g., purchasing goods and services from a Web site). As such, throughout the following description specific details are set forth in order to provide a more thorough understanding of the invention. However, the invention may be practiced without these particulars. In other instances, well known elements have not been shown or described in detail to avoid unnecessarily obscuring the present invention. Accordingly, the specification and drawings are to be regarded in an illustrative rather than a restrictive sense.

SPAM concerns are a major complaint received by on-line service providers. Typically, hundreds of requests by users to be unregistered from these services are received each month as a result of SPAM. These complaints are especially problematic for on-line commerce services, where individual buyers and sellers register on a Web site to buy and sell or to simply communicate with one another regarding topics of mutual interest or to petition one another for information. Bulletin boards or public forums encourage open communication between users. The cornerstone of these communities is the ability to communicate online (i.e., via e-mail). Therefore, on-line service providers are in the uncertain position of both trying to facilitate communication among users while simultaneously trying to prevent users from sending junk e-mail to one another.

What is needed is a system and method that allows users of on-line services to communicate with one another without viewing contact information (e.g., e-mail addresses) and functionality that allows recipients of unsolicited communications (e.g., e-mail) efficiently to complain about the incident. It would also be helpful if functionality existed to monitor the number of SPAM complaints received by a user and for the system to trigger events, such as the inability to use the system for a predetermined time period or to issue warning flags to a user based on thresholds.

Figure 1:
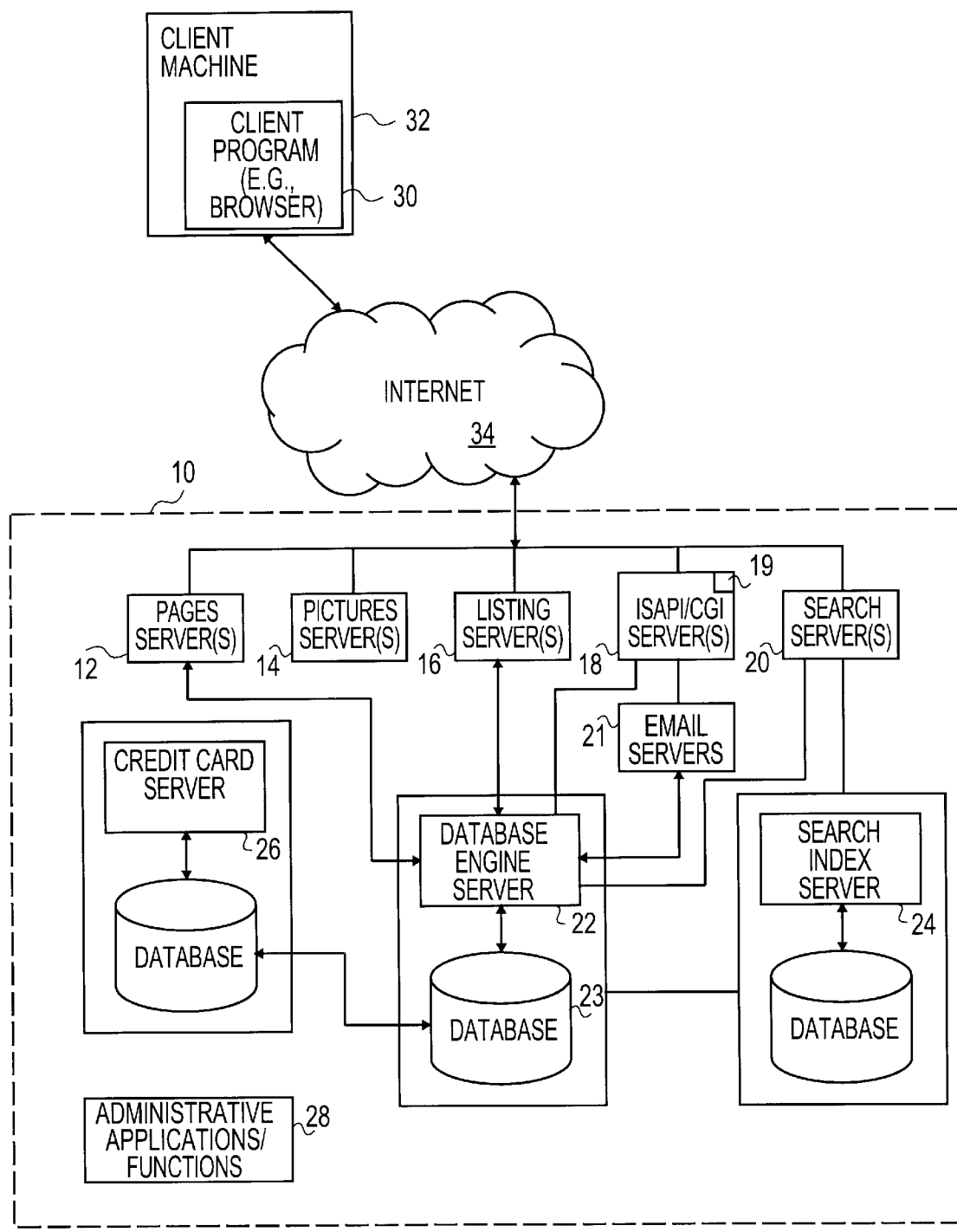
FIG. 1 is a block diagram of an exemplary web-based facility in the form of a network-based auction facility according to one embodiment of the present invention.

Referring now to FIG. 1, there is shown a block diagram of an exemplary web-based facility in the form of a network-based commerce or auction facility according to one embodiment of the present invention. While an exemplary embodiment of the present invention is described within the context of an auction facility, it will be appreciated by those skilled in the art that the invention will find application in many different types of computer-based, and network-based, commerce facilities.

The auction facility has a system 10 including one or more of a number of types of front-end servers, namely page servers 12 that deliver web pages (e.g., markup language documents), picture servers 14 that dynamically deliver images to be displayed within Web pages, listing servers 16, ISAPI/CGI servers 18 that provide an intelligent interface to the back-end of the system 10, and search servers 20 that handle search requests to the system 10. A communication server arrangement in the form of e-mail servers 21 provide, inter alia, automated e-mail communications to users of the system 10.

The back-end servers include a database engine server 22, a search index server 24 and a credit card database server 26, each of which maintains and facilitates access to a respective database. The back-end servers are also shown to include a number of administrative applications or functions 28 that are described in further detail below.

The network-based auction system 10 may be accessed by a client program 30, such as a browser (e.g., the Internet Explorer distributed by Microsoft Corp. of Redmond, Wash.) that executes on a client machine 32 and accesses the system 10 via a network such as, for example, the Internet 34. According to the embodiment illustrated by FIG. 1, a user may contact another user via an electronic communication in the form of an e-mail forwarding feature contained in an e-mail look-up module 19 in the CGI server 18. The system 10 determines the e-mail address of the intended recipient based on the presence of information that is on a web page containing a User ID in question (e.g., when a user is auctioning an item in the facility, the ID of the user appears on the web page). When a user clicks on the User ID from the web page, an item number (e.g., designating an item for sale) and the User ID is passed preferably to an internet server programming interface (ISAPI) to determine the transactional relationship between the clicked user and the requester. The ISAPI allows a web server (or other information server) to launch and interact with external programs in response to requests from clients. The ISAPI is in the form of dynamic link libraries (DLLs) which run in the same process space as the web server and are well known in the art. To determine the transactional relationship, the ISAPI retrieves an item number (if available), then retrieves an associated item record from the database 24, and from that record determines if the requester is a seller or high-bidder on that item. The system 10 then displays the appropriate form (e.g., a contact member form or a form that allows a user to ask a seller a question see FIG. 8) depending on whether the item is still active or not. If the item number is not available, the system 10 automatically displays the contact member form for the user. These forms will be described below.

Figure 2:
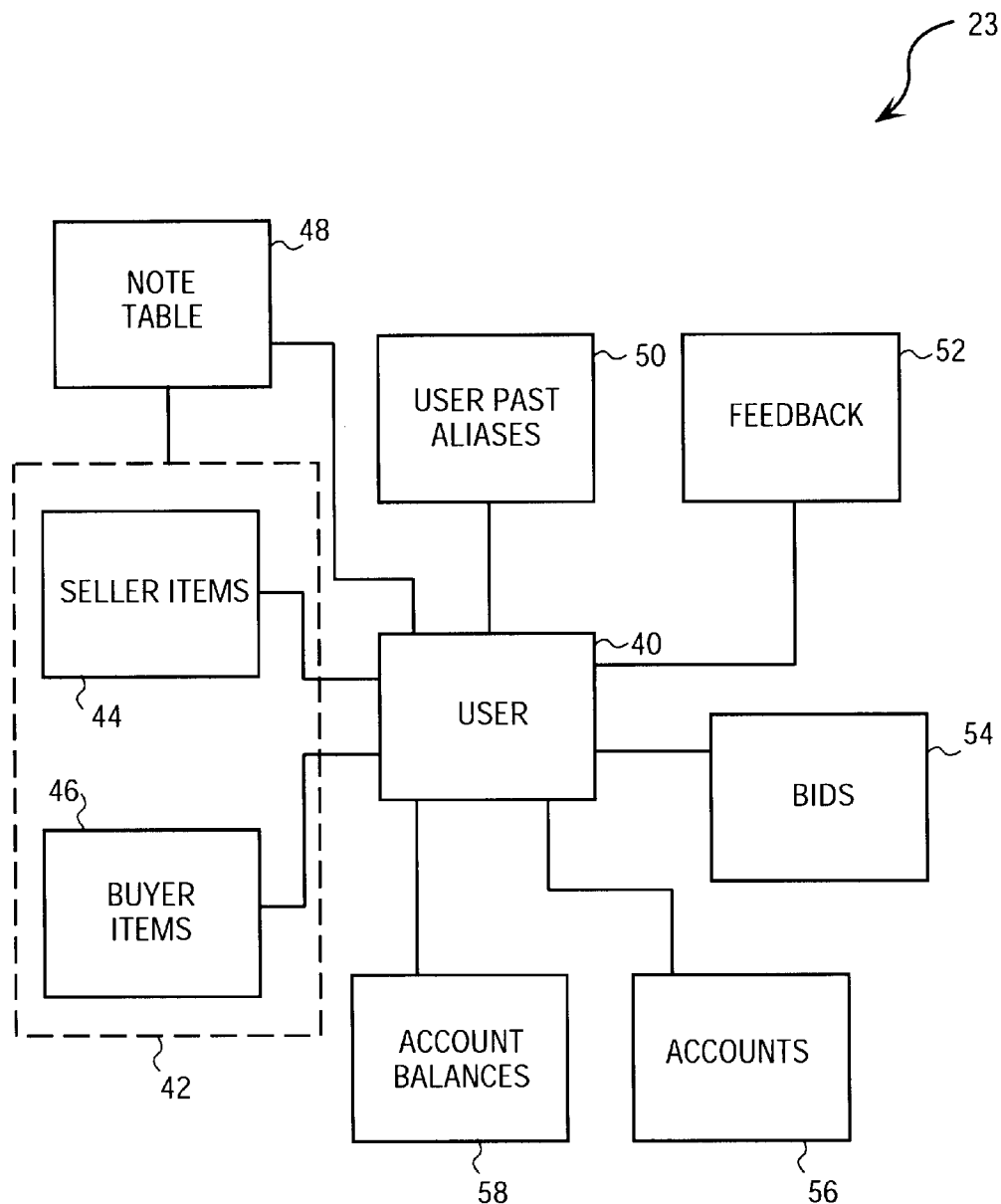
FIG. 2 is a database diagram illustrating an exemplary database, maintained by and accessed via a database engine server, that at least partially implements and supports a SPAM inhibiting tool in the auction facility according to one embodiment of the present invention.

FIG. 2 is a database diagram illustrating an exemplary database 23, maintained by and accessed via the database engine server 22, that at least partially implements and supports the auction system 10. The database 23 is a relational database, and includes a number of tables having entries, or records, that are linked by indices and keys. Central to the database 23 is a user table 40, which contains a record for each user of the auction system 10. A user may operate as a seller, buyer, or both, within the auction system 10. The database 23 also includes item tables 42 that may be linked to the user table 40. Specifically, the item tables 42 include a seller items table 44 and a bidder items table 46. A user record in the user table 40 may be linked to multiple items that are being, or have been, auctioned via the system 10.

A number of other tables are also shown to be linked to the user table 40, namely a user past aliases table 50, a feedback table 52, a bids table 54, an accounts table 56, and an account balances table 58.

Figure 3:
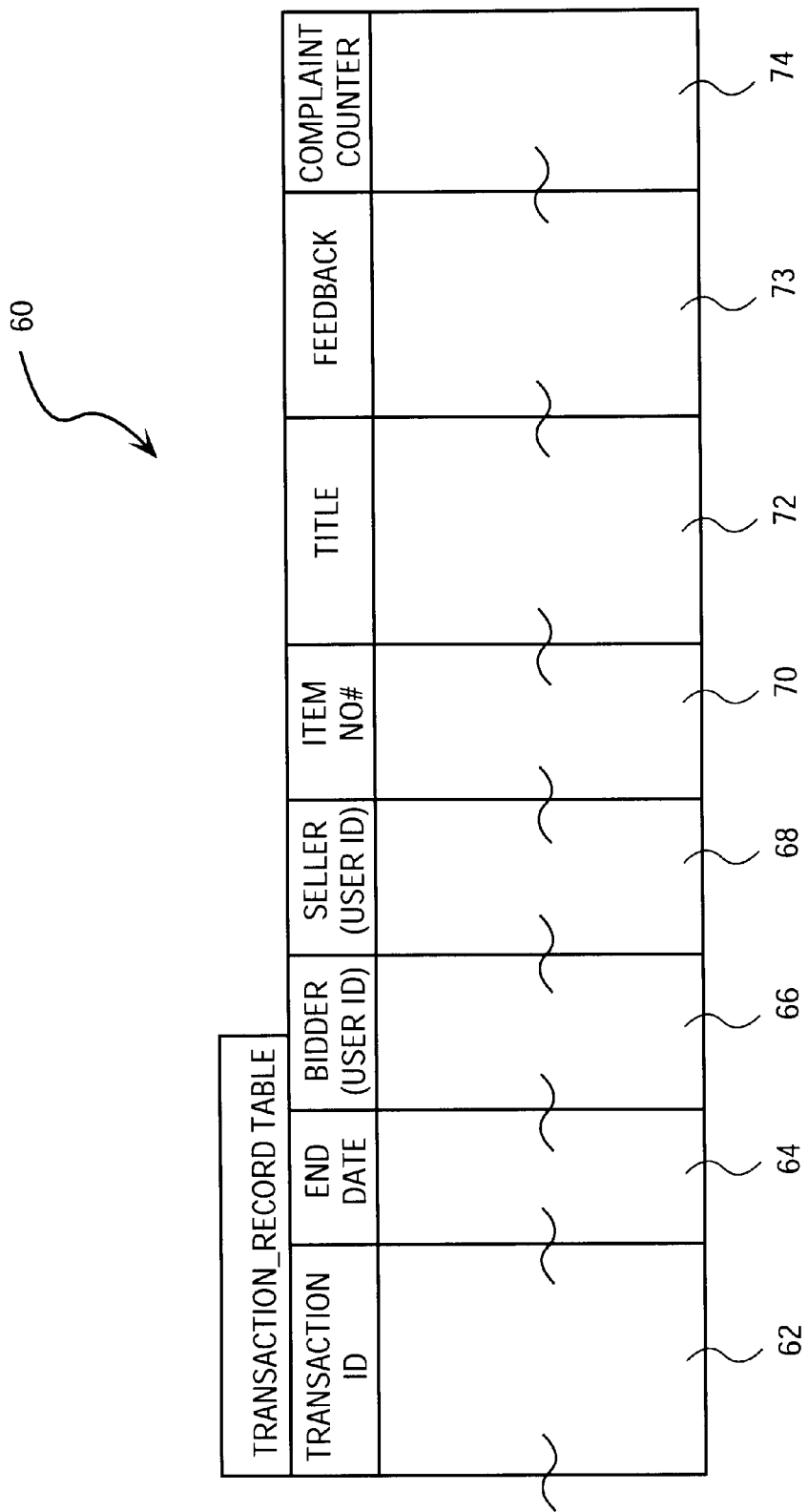
FIG. 3 is an exploded view of the user table shown in FIG. 2.

Referring now to FIG. 3, reference numeral 60 shows an exemplary embodiment of the user table 40 shown in FIG. 2. The user table 60 tracks information relating to any given transaction. For instance, the user table 60 of FIG. 3 has data entry fields for a transaction ID 62, an end date 64, a bidder's User ID 66, a seller's User ID 68, an item number 70, and title 72 of the item for sale. The feedback entry field 73 is a field that may be used to track complaints (e.g., SPAM complaints) against a particular user. The system 10 may also track complaints against a user by storing the complaints in a complaint counter data entry field 74. When complaints against a user reach a particular threshold, sanctions are implemented against the user in a manner that will be described with reference to FIG. 6 below.

Referring now to FIG. 4A, there is shown an exemplary form 100, in accordance with one embodiment of the present invention, that allows users of an on-line service to engage in non-transactional communications with each other using e-mail.

A non-transactional communication is any communication between users of an on-line service that does not relate to an active transaction (e.g., a bid has been placed by the sending user on an item listed by the recipient user) for the purchase or sale of goods and/or services and in which both the sending user and the recipient user are parties to the transaction. The display of e-mail addresses on the site will be prevented to all users not involved in an active transaction. It should be noted that in an active transaction, a seller may view all bidder e-mail addresses and the bidder(s) may view the seller's e-mail address. However, the bidder(s) are not able to view other bidder e-mail addresses. In a closed successful transaction (up to 60 days, in one embodiment) the seller may view the winning bidder's e-mail address and the winning bidder may view the seller's e-mail address.

Using the form of FIG. 4A, however, a user not actively involved in a transaction with another user (e.g., actively bidding on an item) may contact another user via an e-mail forwarding feature. This form appears only in cases where a sending user desires to contact a recipient user and where the intended recipient is not involved in a transaction (e.g., already bidding on an item) with the sending user.

According to the embodiment illustrated by FIG. 4A, users gain access to the on-line system 10 by entering a user ID (i.e., a password) into a client machine or computer 32 coupled to the system 10 via a network (e.g., the Internet 34 shown in FIG. 1). A contact user link or a link from the user ID (not shown in this view) opens the message or contact form 100 that allows entry of a subject heading in a subject heading field 105 and a message in a message field 110. Alternatively, a form is provided that includes a field to receive a sending user ID. To access this form, the sending user is required to log into the system 10 using the user ID. In addition, the form may be configured to limit the amount of text that may be entered (e.g., to 2000 characters) and may be able to limit the number of times messages can be sent per day (e.g., default for 200). Of course, these parameters are flexible and others may be added where needed. When the sending user clicks on a "send" icon 120, the message entered into the message field 110 is automatically forwarded to the recipient user. The recipient user will receive the message including the sending user's e-mail address so that the recipient user can respond if desired. The message entered into the message field 110 is sent to the recipient user by an electronic communication in the form of an SMS, markup language documentation, a FAX, automated telephone call, or the like.

Referring now to FIG. 4B there is shown a sample form 130 that appears on a user's screen when a user is a party to a transaction with another user according to one embodiment of the present invention. The e-mail address 136 of the recipient user is clearly displayed. By clicking on the recipient's e-mail address 136, the sending user is able to access a data entry field (not shown in this view) to send a message to the recipient with whom the sender is engaged in a transaction.

Figure 5:
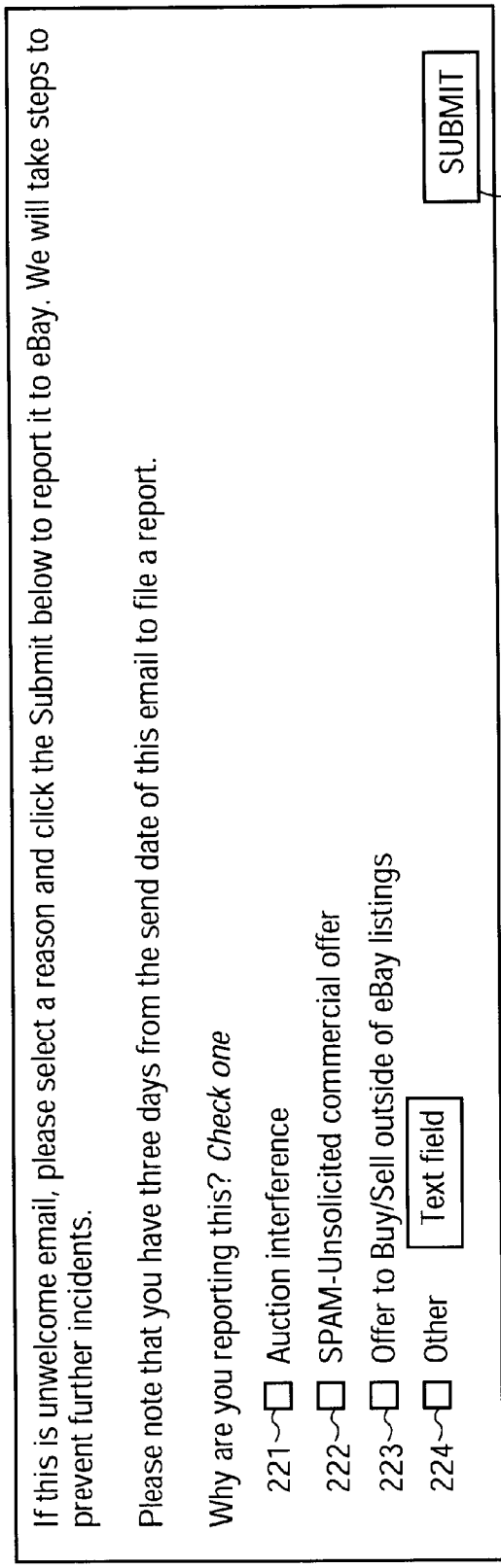
FIG. 5 shows a sample form for reporting a complaint regarding an unsolicited e-mail to a web-based commerce facility, according to one embodiment of the present invention.

Referring now to FIG. 5, there is shown a sample compliant form 200 for reporting a complaint, in accordance with one embodiment of the present invention, to the auction facility regarding an unsolicited e-mail. The form 200 of FIG. 5 provides functionality in the exemplary form of checkboxes to allow recipients of the forwarded messages of FIG. 4A to tag the incident as a SPAM complaint and for the on-line service to automatically provide senders with warnings or educational messages using code contained within the system 10. Recipients who click on a link (not shown in this view) are provided with the form and are then able to classify the reason by selecting one or more checkboxes 221, 222, 223, and 224 for their complaint and to send their complaint to an on-line service. Users may also enter comments regarding the complaint. By simply clicking on a "submit" icon 210 or some other type of send feature, the complaint is forwarded by the on-line service to the intended recipient of the message.

Additional functionality is provided by the system 10 in that it monitors the number of SPAM complaints received against a user and triggers events (e.g., inability to use the feature, warning flags, suspension flags, etc.) based on thresholds, and displays the number of complaints against the user (their complaint level). The system 10 captures and stores the SPAM complaint frequency and associates these with the user account to allow for enforcement/policing processes as will be discussed in greater detail with reference to the embodiment illustrated by FIG. 6.

Figure 6A:
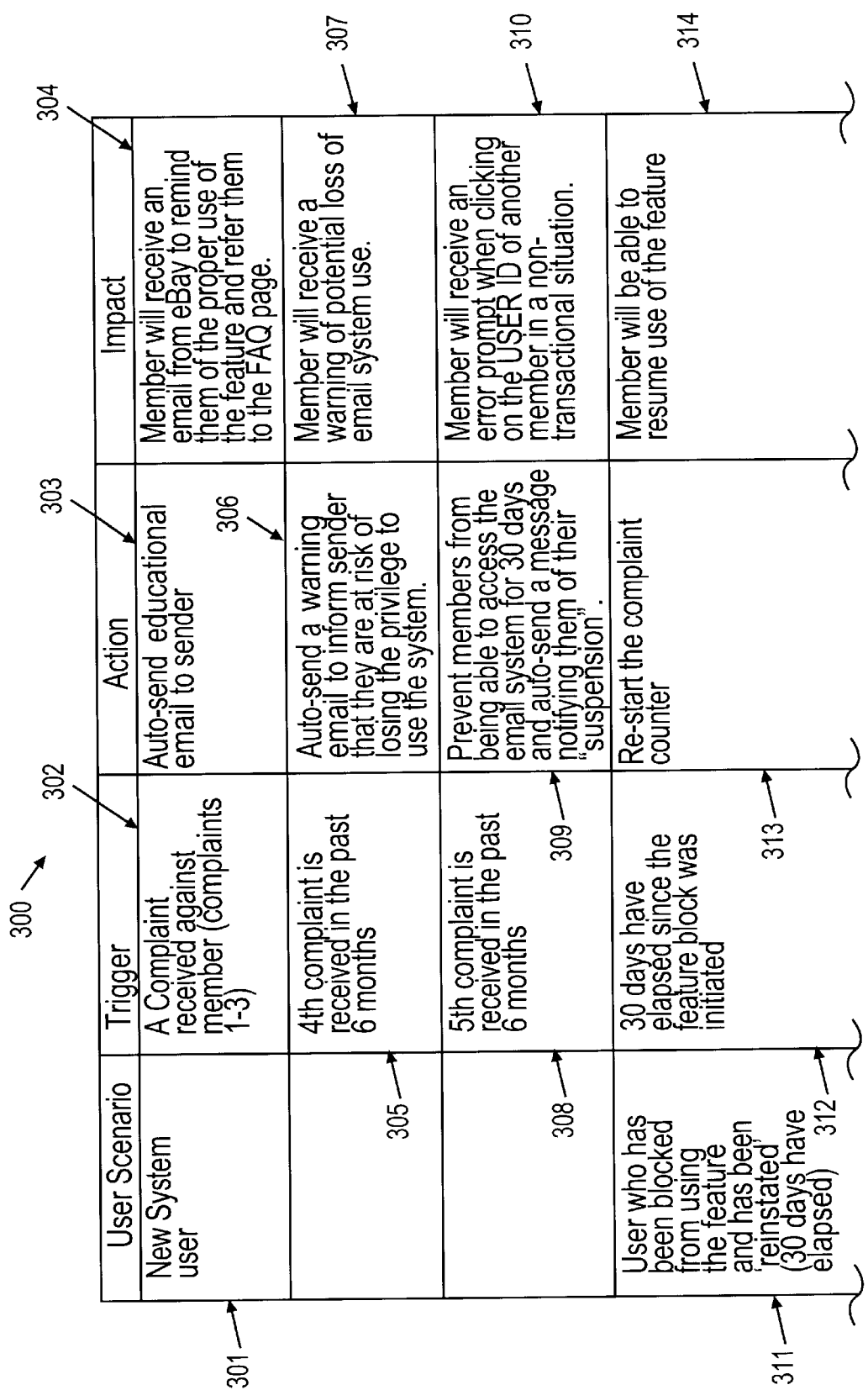

Referring now to FIG. 6, there is shown a matrix 300 of the sanctions implemented against users who SPAM other users of the on-line service, in accordance with one embodiment of the present invention, provided by the system 10. The sanctions embody methods to be performed by a computer such as a server coupled to client computers (see FIGS. 1 and 9). The methods are performed by computer programs that respond to certain user actions with various sanctions implemented against the users. Describing the methods by reference to the matrix 300 enables one skilled in the art to develop such programs including such instructions to carry out the methods on suitably configured computers. The processor of the computer executes these instructions from computer-readable media acting as either a local computer or a remote server. If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the invention described herein. Furthermore, it is common in the art to speak of software, in one form or another (e.g., program, procedure, process, application, module, logic, etc.) as taking an action or causing a result. Such expressions are merely a shorthand way of saying that execution of the software by a computer causes the processor of the computer to perform an action or produce a result. It will be further appreciated that the instructions represented in the blocks in FIG. 6 are not required to be performed in the order illustrated, and that all the processing represented by the blocks may not be necessary to practice the invention.

According to the embodiment illustrated by FIG. 6, if a new system user (block 301) is complained against by a SPAM recipient by more than a predetermined threshold, e.g. 1–3 times (block 302), the system 10 automatically sends an educational e-mail (block 303) to the sending user who sent the SPAM. For example, the warning could state that the on-line service does not tolerate unsolicited commercial e-mail (SPAM) and transaction interference, and will take steps to protect its users from this abuse. The sanction on the sender may be nominal (e.g., the sender may be referred to the on-line service provider's FAQ page (block 304)). If the sender of SPAM receives a fourth complaint within six months (block 305), the system 10 automatically sends a warning (block 306) to the sender (block 307). If the sending user of SPAM receives a fifth complaint in six months (block 308), the system 10 automatically prevents the user sending the SPAM from being able to access the e-mail system for 30 days (block 309) and sends a message notifying the sender of their suspension (block 310). This particular sender will subsequently receive an error prompt when clicking on the user ID of another user when trying to access the contact form used for non-transactional communications among users described in the embodiment illustrated by FIG. 4A.

A user who has been blocked from using the feature that allows forwarding of non-transactional e-mails (see block 311), and that has been reinstated (e.g., 30 days have elapsed as shown in block 312), is allowed to use the feature again. The system 10 re-starts the complaint counter (block 313) and the user will be able to resume use of the feature (block 314). The same triggers, actions, and impacts (blocks 315, 316, 317, etc.) apply to the reinstated user (block 311) (i.e., one who has previously been suspended from the system 10 for SPAM) as to the new user (block 301) of the system 10. Of course, it should be appreciated that the triggers, actions, and impacts described in the embodiment illustrated by FIG. 6 are flexible. For example, in another embodiment the sanctions against a new user (block 301) may be entirely different (e.g., less stringent) than the sanctions implemented against a reinstated user (block 311).

Figure 7A:
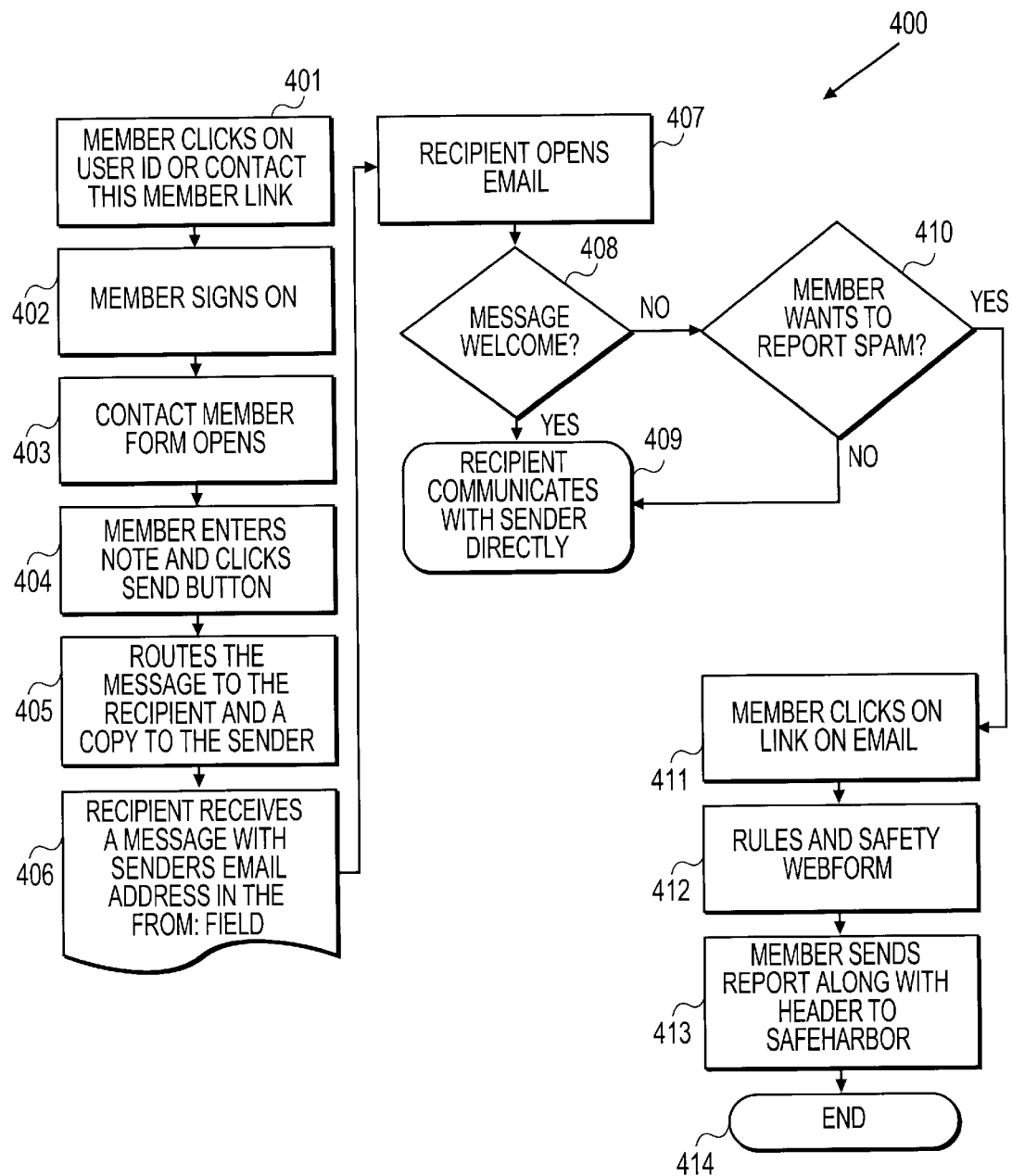
FIG. 7A is a diagram of a user-to-user non-transactional communication flow according to one embodiment of the present invention.

Referring now to FIG. 7A there is shown a diagram of a user-to-user non-transactional communication flow 400 according to one embodiment of the present invention. A user clicks on the user ID or "Contact this User" link (block 401) and signs on (block 402). The sample contact form 100 (see FIG. 4A) that allows the user to engage in a non-transactional communication (e.g., the user has not yet bid on the item the seller has listed and requires further information) with another user is then provided (block 403). The user enters a quick message in the message field 110 (e.g., "Hello. I see you are interested in beanies. I have an offer you won't be able to refuse . . . ") and clicks the "send" button 120 (block 404). The on-line service routes the message to the recipient user and, if requested by the sender, forwards a copy of the message to the sending user (block 405). The recipient user receives the message including the sender's e-mail address in a "From: field" (block 406). The recipient proceeds to open the mail (block 407). If the message is welcome (block 408) then the recipient user communicates directly with the sending user (block 409). If the recipient user chooses to report the message 110 as SPAM (block 410) then the recipient user clicks on a link (block 411) and completes the form 200 (see FIG. 5) for reporting a complaint to the auction facility of unsolicited e-mail (block 412). The recipient user sends the form 200 (block 413) by clicking the "submit" icon 210 and the process is complete (block 414).

Figures 1, 7B:
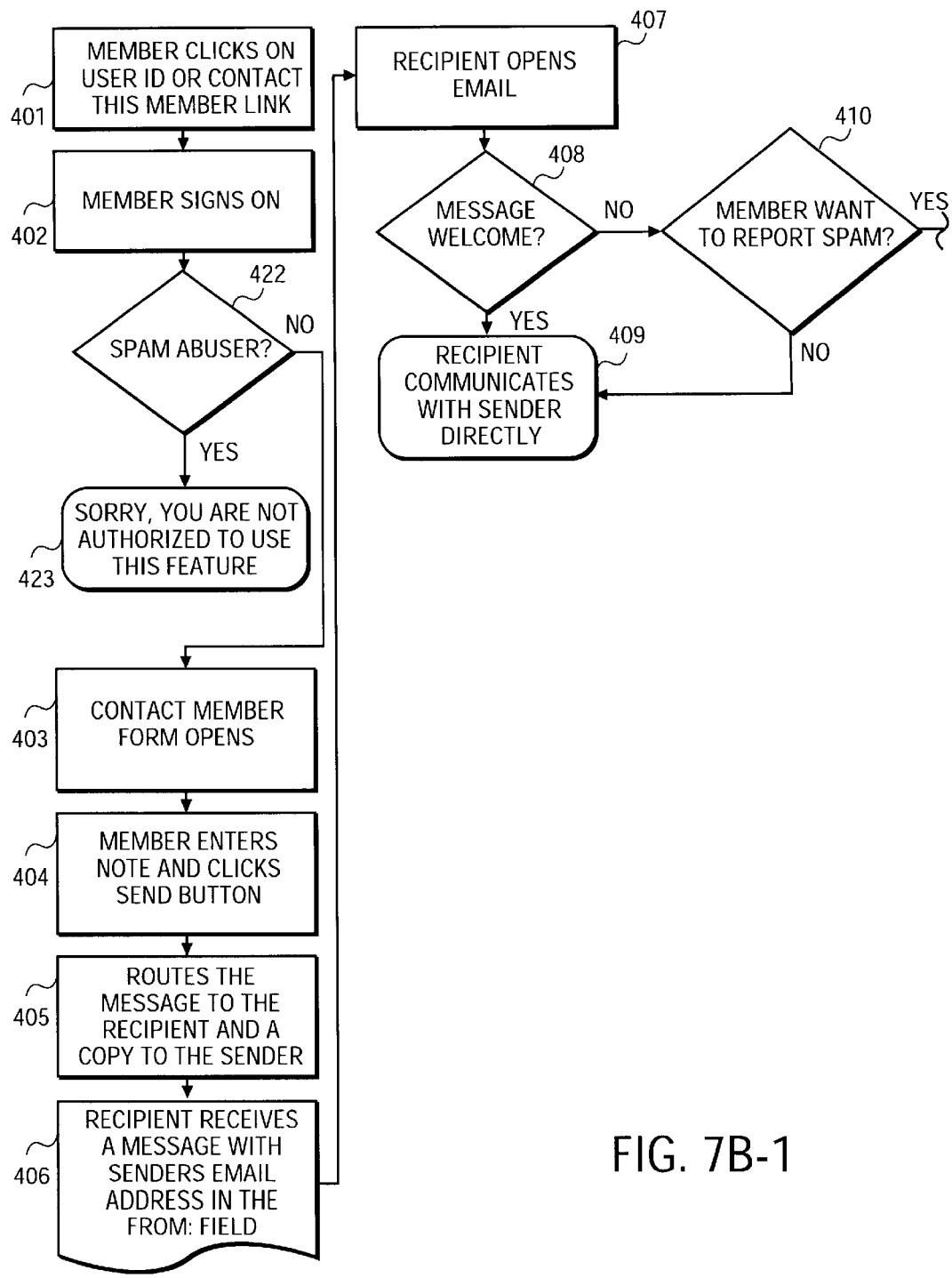
Figures 2, 7B:
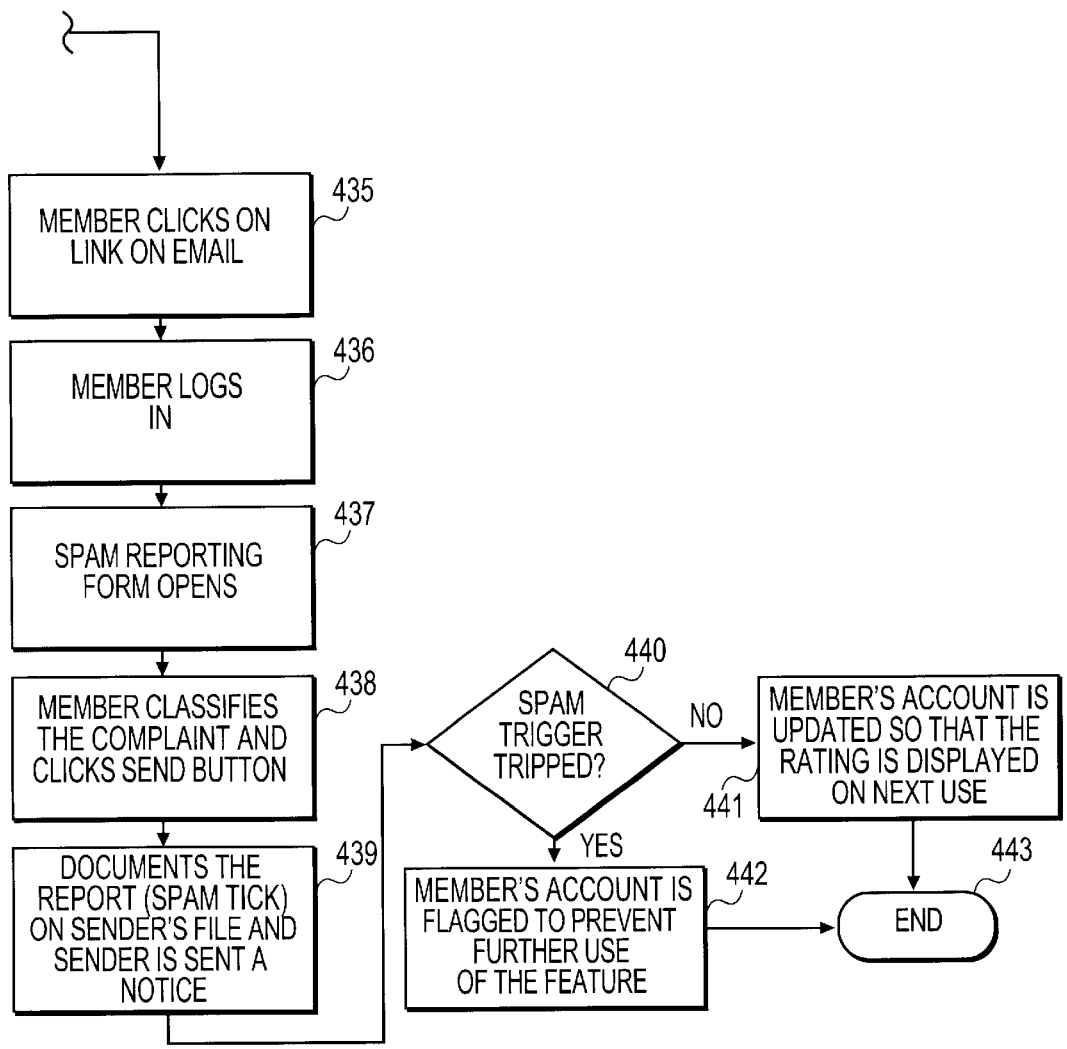

Referring now to FIG. 7B there is shown a diagram of the user-to-user non-transactional communication flow of FIG. 7A further including implementation of a SPAM prevention feature. As in FIG. 7A, the user clicks on the User ID (block 401) and signs on (block 402). However, in the flow diagram of FIG. 7B, the system 10 queries whether or not this user is a SPAM abuser (block 422) by searching the complaint counter 74 in the user table 60 illustrated in FIG. 3. For example, a database management system in the database server that operates with a known database language such as structured query language (SQL) may be used to manage, store, and retrieve information from the user table 60 regarding SPAM complaints against a user (see FIG. 3. The system 10 checks how many complaints have been associated with the user's account. If the SPAM counter for the user is past a given threshold, the user is unable to access the contact form 100 for non-transactional communications (block 423) and is thus prevented from contacting the intended recipient. If the user is not a SPAM abuser, the user may proceed to open the contact form 100 (block 403), and proceed through the steps previously described in FIG. 7A (blocks 404, 405, 406, etc.). If, the recipient wants to report SPAM, the user clicks on a link (block 435) and logs in with a user ID (block 436). The complaint form 200 (see FIG. 5) opens (block 437). The user may classify the complaint as SPAM and submit the complaint (block 438). The on-line service documents the report in the sender's file and sends a notice to the sender (block 439) (see FIG. 6). The system 10 is then queried to see if the SPAM trigger should be tripped (e.g., if the user has reached a threshold where the user has accumulated a certain number of SPAM complaints) (block 440). If the answer to the query is "yes", then the user's account and further use of the contact form 100 will be prevented (block 442). If the answer is "no", then the user's account is updated so that the SPAM rating is displayed during the user's next use of the system 10 (block 441) and the process is complete (block 443).

It should be appreciated, of course, that the instructions represented by the blocks in FIGS. 7A and 7B are not required to be performed in the order illustrated, and that all the processing represented by the blocks may not be necessary to practice the invention.

As the sending user may not be provided with direct contact information, but merely a user 10 of the recipient, the sending user may be inhibited from contacting the recipient user directly. The system 10 may use the user ID to obtain direct contact information wherafter the sending user's message 110 may be forwarded in an automated fashion to the recipient user.

Figure 8:
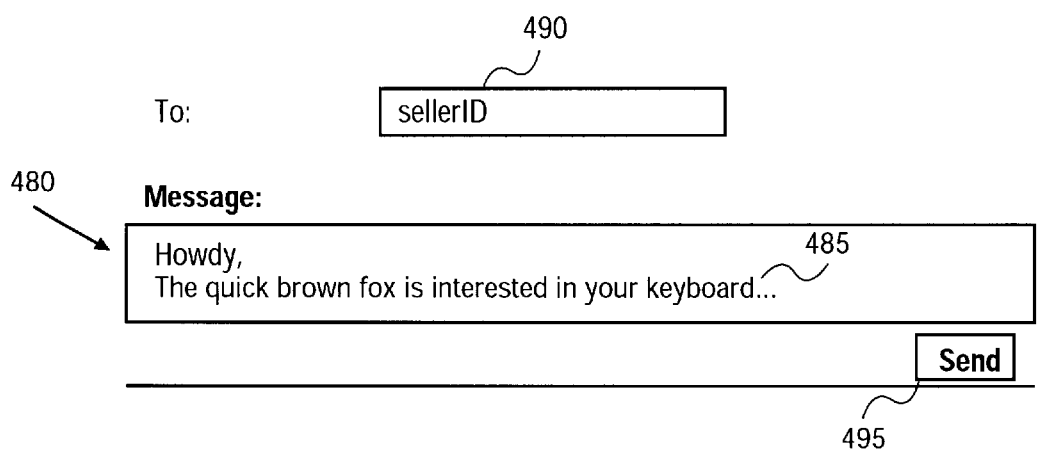
FIG. 8 shows a sample form that allows a user of an on-line service to ask a seller a question without revealing the seller's e-mail address to the user according to one embodiment of the present invention.

Referring now to FIG. 8 there is shown a sample form 480 that allows a user of an on-line service to ask a seller a question without revealing the seller's e-mail address to the user in accordance with one embodiment of the present invention. The form 480 is presented to a user who wants to ask the seller a question 485, and the user is assumed to be a potential bidder. A seller's ID 490 is visible to users on the Web site. A link (not shown in this view) to access the form 480 will only be visible while the transaction is still active and to high bidders after successful transactions. The sender may fill out the form 480 and press a "send" icon 495. The form 480 will be forwarded to the seller by the on-line service. The seller will receive the e-mail with the sender's return address.

Figure 9:
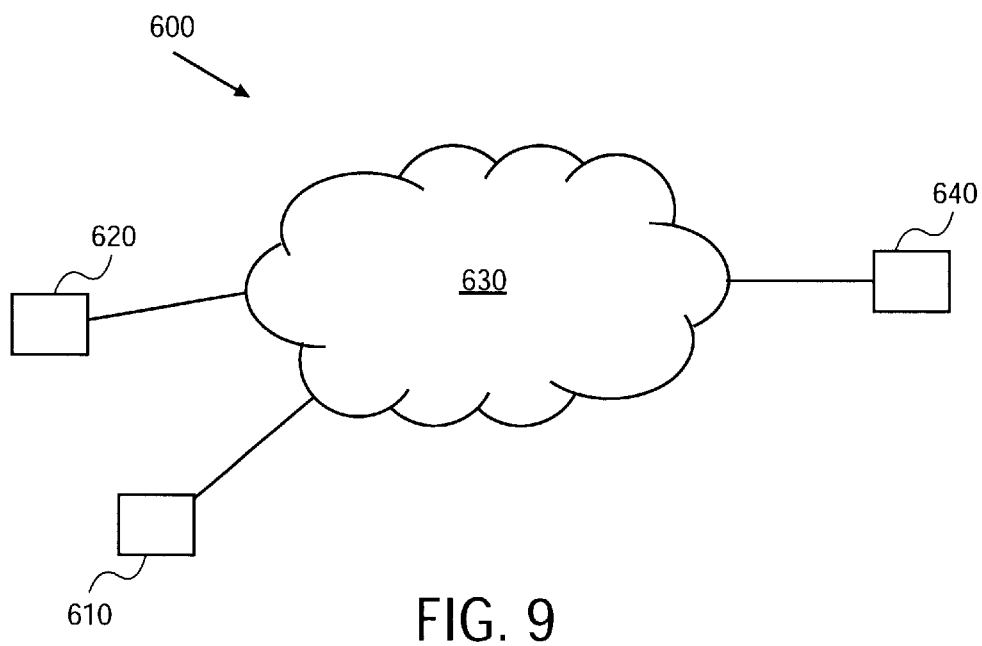
FIG. 9 is a block diagram of a computer system connected to multiple client computer systems on a network.

Referring now to FIG. 9 there is shown a further example of a server computer system 600 connected to multiple client computers on a network 630. It should be understood that although only two client computers 610 and 620 are illustrated in this example, in operation it is anticipated that essentially any number of client computers may utilize the facility 600 through the network 630. A server 640 may include the system described herein to prevent SPAM being sent to users of an on-line service, such as the on-line bidding service described herein. System users may communicate with the system 600 through the Internet 630 using the client computers 610 and 620. Although the network 630 is described herein as being the Internet, alternatively, the network 630 may be a corporate intranet, a Wide Area Network (WAN), a Local Area Network (LAN), or any other system of interconnections enabling two or more computers to exchange information. Further, the network 630 may include a wireless network, such that one or more of client devices 610 and 620 may be wireless devices.

Figure 10:
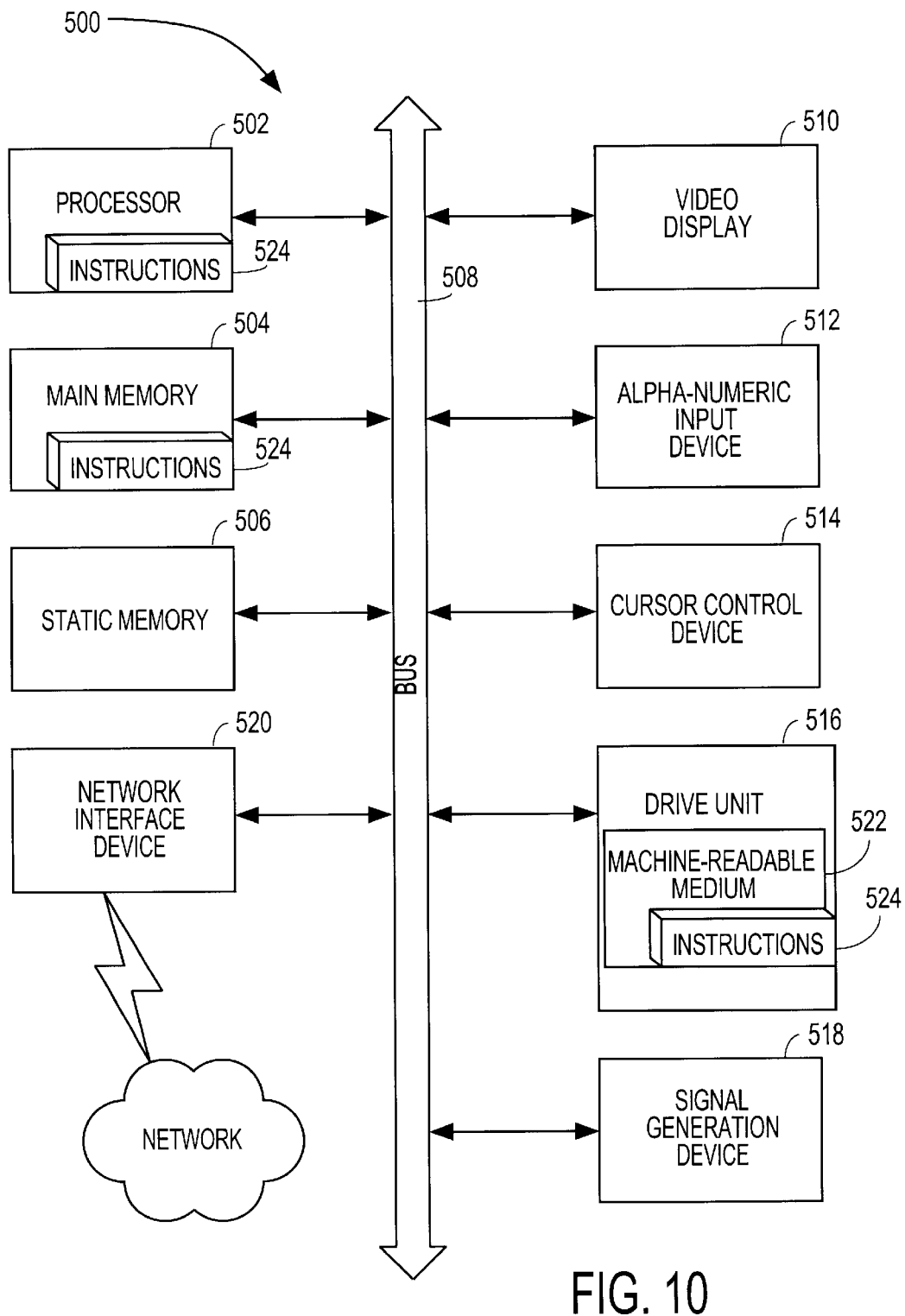
FIG. 10 is a high-level block diagram of an exemplary computer system.

FIG. 10 shows a diagrammatic representation of machine in the exemplary form of a computer system 500 within which a set of instructions, for causing the machine to perform any one of the methodologies discussed above, may be executed. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 500 includes a processor 502, a main memory 504 and a static memory 506, which communicate with each other via a bus 508. The computer system 500 may further include a video display unit 510 (e.g., a liquid crystal display (LCD) or cathode ray tube (CRT). The computer system 500 also includes an alphanumeric input device 512 (e.g. a keyword), a cursor control device 514 (e.g. a mouse) a disk drive unit 516, a signal generation device 518 (e.g. a speaker) and a network interface device 520.

The disk drive unit 516 includes a machine-readable medium 522 on which is stored a set of instructions (i.e., software) 524 embodying any one, or all, of the methodologies described above. The software 524 is also shown to reside, completely or at least partially, within the maim memory 504 and/or within the processor 502. The software 524 may further be transmitted or received via the network interface device 520. For the purposes of this specification, the term "machine-readable medium" shall be taken to include any medium which is capable of storing or encoding a sequence of instructions for execution by the machine and that cause the machine to perform any one of the methodologies of the present invention. The term "machine-readable medium" shall accordingly be taken to included, but not be limited to, solid-state memories, optical and magnetic disks, and carriers wave signals.

Thus, a method and a system to control sending of unsolicited communications over a network have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method to control sending of unsolicited communications relating to a plurality of listings in a network-based commerce facility, the method including:
   presenting at least one listing for sale via the network-based commerce facility;
   monitoring a request from a sending user to communicate with a recipient user associated with the at least one listing for sale;
   generating, at the network-based commerce facility, a contact form to receive a message to be communicated to the recipient user without the sending user viewing direct contact information of the recipient user, and communicating the contact form to the sending user; and
   communicating, from the network-based commerce facility, an electronic communication including the message to the recipient user over the network.

2. The method of claim 1 which includes generating the electronic communication as a document including a user-selectable link to cause communication of a complaint form to the recipient user, the complaint form to receive complaint information regarding the sending user of an unsolicited electronic communication.

3. The method of claim 2 which includes receiving and storing the complaint information at the network-based commerce facility, and associating the complaint information with the sending user of the unsolicited electronic communication.

4. The method of claim 3 wherein the network-based commerce facility imposes sanctions on the sending user of the electronic communication based on frequency of complaints associated with the sending user.

5. The method of claim 4 wherein the sanctions include not allowing the sending user to send a message to a recipient user with the contact form when the frequency of complaints associated with the sending user reaches a predetermined threshold.

6. The method of claim 2 wherein the complaint form includes user-selectable complaint classification information to be included within the complaint information.

7. The method of claim 6 wherein the complaint classification information includes identification of an offer to transact outside the network-based commerce facility.

8. The method of claim 6 wherein the complaint classification information includes a textual description of the complaint.

9. The method of claim 1 wherein the contact form includes a field to receive the message and a field to enter a user ID of the recipient user.

10. The method of claim 9 wherein the communicating includes performing a look-up on the user ID.

11. The method of claim 9 wherein the network-based commerce facility parses information entered into the contact form by the sending user to extract the message and the user ID of the recipient user.

12. The method of claim 1 wherein the network-based commerce facility enables the at least one sending and recipient user to engage in transactional communications relating to a transactional process in which the at least one sending and recipient user is already engaged, and to engage in non-transactional communications unrelated to the transactional process and in which the users are not yet engaged.

13. The method of claim 12 wherein the transactional process is one of a group of transactional processes including an auction process and a fixed price process.

14. The method of claim 1 which includes providing a form accessible from the network-based commerce facility allowing a user to send another user a question regarding a bidding transaction without the sending user viewing the e-mail address of the recipient user.

15. The method of claim 14 which includes forwarding the form including the question to the recipient user by the network-based commerce facility via e-mail over the network.

16. The method of claim 1 wherein the generating of the contact form is responsive to sending of a user ID of the recipient user to the network-based commerce facility.

17. The method of claim 16 wherein the sending of the contact form includes a selection by the sending user of a link associated with the recipient user.

18. The method of claim 1 wherein the electronic communication includes any one of a group of electronic communications including SMS, markup language documentation, FAX, and automated telephone calls.

19. The method of claim 1 wherein the direct contact information includes any one of a group of information types including fax, postal, e-mail, network, and telephone contact information.

20. The method of claim 1 wherein users gain access to the network-based commerce facility with a user ID, the user ID being visible to the other users of the network-based commerce facility.

21. The method of claim 1 wherein the network-based commerce facility associates a user ID of the recipient user with an e-mail address of the recipient user, the contact form being communicated to the e-mail address associated with the user ID selected by the sending user.

22. The method of claim 1 wherein the network-based commerce facility is a bidding service and the contact form relates to a non-transactional communication wherein the sending user is not engaged in a bidding transaction with the recipient user.

23. The method of claim 1 wherein the users access the network-based commerce facility using one or more client computers coupled to the facility over the network.

24. The method of claim 1 wherein the network is the Internet.

25. A network-based commerce system comprising:
   a listing server to present to a user at least one listing for sale via the network-based commerce system;
   a page server to monitor a request from a sending user to communicate with a recipient user associated with the at least one listing for sale and to generate a contact form, the contact form to receive a message from the sending user to be communicated over the network to the recipient user without the sending user viewing direct contact information of the recipient user; and
   a communications server to communicate an electronic communication including the message over the network.

26. The system of claim 25 wherein the electronic communication is generated as a document including a user-selectable link to cause communication of a complaint form to the recipient user, the complaint form to receive complaint information regarding the sending user of an unsolicited electronic communication.

27. The system of claim 26 wherein the network-based commerce system receives and stores the complaint information and associates the complaint information with the sending user of the unsolicited electronic communication.

28. The system of claim 27 wherein the network-based commerce system imposes sanctions on the sending user of the electronic communication based on frequency of complaints associated with the sending user.

29. The system of claim 28 wherein the sanctions include not allowing the sending user to send a message to a recipient user with the contact form when the frequency of complaints associated with the sending user reaches a predetermined threshold.

30. The system of claim 26 wherein the complaint form includes user-selectable complaint classification information to be included within the complaint information.

31. The system of claim 30 wherein the complaint classification information includes identification of an offer to transact outside the network-based commerce system.

32. The system of claim 30 wherein the complaint classification information includes a textual description of the complaint.

33. The system of claim 25 wherein the contact form includes a field to receive the message and a field to enter a user ID of the recipient user.

34. The system of claim 33 wherein the electronic communication includes performing a look-up on the user ID.

35. The system of claim 33 wherein the network-based commerce system parses information entered into the contact form by the sending user to extract the message and the user ID of the recipient user.

36. The system of claim 25 wherein the page server enables a user to engage in transactional communications related to ban active transactional process in which users are already engaged, and to engage in non-transactional communications unrelated to the transactional process and in which the users are not yet engaged.

37. The system of claim 36 wherein the transactional process is any one of a group of transactional processes including an auction process and a fixed price process.

38. The system of claim 25 wherein the generating of the contact form is responsive to sending of a user ID of the recipient user to the network-based commerce system.

39. The system of claim 38 wherein the sending of the contact form includes a selection by the sending user of a link associated with the recipient user.

40. The system of claim 25 wherein the network-based commerce system includes a form accessible from the network-based commerce system allowing a user to send another user a question regarding a bidding transaction without the sending user viewing the e-mail address of the recipient user.

41. The system of claim 40 wherein the form including the question is forwarded to the recipient user by the network-based commerce system via e-mail over the network.

42. The system of claim 25 wherein the electronic communication includes any one of a group of electronic communications including SMS, markup language documentation, FAX, and automated telephone calls.

43. The system of claim 25 wherein the direct contact information includes any one of a group of information types including FAX, postal, e-mail, network, and telephone contact information.

44. The system of claim 25 wherein users gain access to the network-based commerce system with a user ID, the user ID being visible to the other users of the network-based commerce system.

45. The system of claim 25 wherein the network-based commerce system associates a user ID of the recipient user with an e-mail address of the recipient user, the contact form being communicated to the e-mail address associated with a user ID selected by the sending user.

46. The system of claim 25 wherein the network-based commerce system is a bidding service and the contact form is utilized by a sending user not engaged in a bidding transaction with a recipient user.

47. The system of claim 25 wherein the users access the network-based commerce system using one or more client computers coupled to the system over the network.

48. A machine-readable storage medium tangibly embodying a sequence of instructions executable by a machine to perform a method for controlling the sending of unsolicited communications relating to a plurality of listings in a network-based commerce facility, the method comprising:
   presenting at least one listing for sale to a user via the network-based commerce facility;
   monitoring a request from a sending user to communicate with a recipient user associated with the at least one listing for sale;

generating at the network-based commerce facility, a contact form to receive a message to be communicated to the recipient user without the sending user viewing direct contact information of the recipient user and communicating the contact form to the sending user; and communicating from the network-based commerce facility, an electronic communication including the message to the recipient user over the network.

49. The machine-readable storage medium of claim 48 which includes generating the electronic communication as a document including a user-selectable link to cause communication of a complaint form to the recipient user, the complaint form to receive complaint information regarding the sending user of an unsolicited electronic communication.

50. The machine-readable storage medium of claim 49 which includes receiving and storing the complaint information by the network-based commerce facility, and associating the complaint information with the sending user of the unsolicited electronic communication.

51. The machine-readable storage medium of claim 50 wherein the network-based commerce facility imposes sanctions on the sending user of the electronic communication based on frequency of complaints associated with the sending user.

52. The machine-readable storage medium of claim 51 wherein the sanctions include not allowing the sending user to send a message to a recipient user with the contact form when the frequency of complaints associated with the sending user reaches a predetermined threshold.

53. The machine-readable storage medium of claim 49 wherein the complaint form includes user-selectable complaint classification information to be included within the complaint information.

54. The machine-readable storage medium of claim 53 wherein the complaint classification information includes identification of an offer to transact outside the network-based commerce facility.

55. The machine-readable storage medium of claim 53 wherein the complaint classification information includes a textual description of the complaint.

56. The machine-readable storage medium of claim 48 wherein the contact form includes a field to receive the message and a field to enter a user ID of the recipient user.

57. The machine-readable storage medium of claim 56 wherein the communicating includes performing a look-up on the user ID recipient user.

58. The machine-readable storage medium of claim 57 wherein the network-based commerce facility parses information entered into the contact form by the sending user to extract the message and the user ID of the recipient user.

59. The machine-readable storage medium of claim 48 wherein the network-based commerce facility is to enable a user to engage in transactional communications relating to an active transactional process in which users are already engaged, and to engage in non-transactional communications unrelated to the transactional process and in which the users have not yet engaged.

60. The machine-readable storage medium of claim 59 wherein the transactional process is any one of a group of transactional processes including an auction process and a fixed price process.

61. The machine-readable storage medium of claim 48 wherein the generating of the contact form is responsive to sending of a user ID of the recipient user to the network-based commerce facility.

62. The machine-readable storage medium of claim 61 wherein the sending of the contact form includes a selection by the sending user of a link associated with the recipient user.

63. The machine-readable storage medium of claim 48 which includes providing a form accessible from the network-based commerce facility allowing a user to send another user a question regarding a bidding transaction without the sending user viewing the e-mail address of the recipient user.

64. The machine-readable storage medium of claim 63 which includes forwarding the form including the question to the recipient user by the network-based commerce facility via e-mail over the network.

65. The machine-readable storage medium of claim 48 wherein the electronic communication includes any one of a group of electronic communications including SMS, markup language documentation, FAX, and automated telephone calls.

66. The machine-readable storage medium of claim 48 wherein the direct contact information includes any one of a group of information types including fax, postal, e-mail, network, and telephone contact information.

67. The machine-readable storage medium of claim 48 wherein users gain access to the network-based commerce facility with a user ID, the user ID being visible to the other users of the network-based commerce facility.

68. The machine-readable storage medium of claim 48 wherein the network-based commerce facility associates a user ID of the recipient user with an e-mail address of the recipient user, the contact form being communicated to the e-mail address associated with a user ID selected by the sending user.

69. The machine-readable storage medium of claim 48 wherein the network-based commerce facility is a bidding service and the contact form is utilized by a sending user not engaged in a bidding transaction with a recipient user.

70. The machine-readable storage medium of claim 48 wherein the users access the network-based commerce facility using one or more client computers coupled to the facility over the network.

71. The machine-readable storage medium of claim 48 wherein the network is the Internet.

72. A network-based commerce system to control sending of unsolicited communication over a network, the system including:

means for presenting to a user at least one listing for sale via the network-based commerce system;

means for monitoring a request from a sending user to communicate with a recipient user associated with at least one of the plurality of listings for sale and for generating, a contact form to receive a message to be communicated to the recipient user without the sending user viewing direct contact information of the recipient user and communicating the contact form to the sending user; and means for communicating at a network-based commerce system, an electronic communication including the message to the recipient user over the network.

73. The system of claim 72 wherein the contact form includes a field to receive the message and a field to enter a user ID of the recipient user.

74. The system of claim 73 wherein the communicating includes performing a look-up on the user ID of the recipient user.

75. The system of claim 73 wherein the network-based commerce system parses information entered into the contact form by the sending user to extract the message and the user ID of the recipient user.

76. The system of claim 72 wherein the network-based commerce system is to enable a user to engage in transactional communications relating to an active transactional process in which users are already engaged, and non-transactional communications unrelated to the transactional process and in which the users are not yet engaged.

77. The system of claim 76 wherein the transactional process is any one of a group of transactional processes including an auction process and a fixed price process.

* * * * *

UNITED STATES PATENT AND TRADEMARK OFFICE
CERTIFICATE OF CORRECTION

PATENT NO. : 6,748,422 B2
DATED : June 8, 2004
INVENTOR(S) : Morin et al.

It is certified that error appears in the above-identified patent and that said Letters Patent is hereby corrected as shown below:

Title page,
Item [56], References Cited, OTHER PUBLICATIONS,
"Malone, T.W." reference, delete "communication" and insert -- communications --.
"Zwass, Vladimir" reference, after "vol" delete "," and insert -- . --.
"Priest, Chris" reference, delete "To1" and insert -- TOL --.
"Resnick, Paul" reference, delete "((Dialog" and insert -- (Dialog) --.

Column 4,
Line 65, after "and" insert -- a --.

Column 8,
Line 7, after "FIG. 3" insert -- ) --.

Column 12,
Line 12, delete "ban" and insert -- an --.

Column 13,
Line 59, delete "vet" and insert -- yet --.

Column 14,
Line 53, after "generating" delete ",".

Signed and Sealed this

Twenty-eighth Day of February, 2006

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,748,422 B2 | Page 1 of 1 |
| APPLICATION NO. | : 09/982415 | |
| DATED | : June 8, 2004 | |
| INVENTOR(S) | : Noel Morin et al. | |

It is certified that error appears in the above-identified patent and that said Letters Patent is hereby corrected as shown below:

On the Title page item (75), after "Hilary Holmquest, Menlo Park, CA (US)" please insert --, Reed Maltzman, San Francisco, CA (US) and Jeffrey Taylor, Los Altos, CA (US) --.

Signed and Sealed this

Twenty-fifth Day of July, 2006

JON W. DUDAS
*Director of the United States Patent and Trademark Office*